United States Patent

[11] 3,577,011

| [72] | Inventors | Joseph Gino Raffaelli<br>Granda Hills;<br>Hendricus Johnnes Lokkart, Arleta, Calif. |
|---|---|---|
| [21] | Appl. No. | 736,686 |
| [22] | Filed | June 13, 1968 |
| [45] | Patented | May 4, 1971 |
| [73] | Assignee | International Telephone and Telegraph Corporation<br>New York, N.Y. |

[54] TEST CIRCUIT
2 Claims, 1 Drawing Fig.

[52] U.S. Cl. ..................................... 307/252C,
307/252Q, 307/252W, 307/293, 323/22SC
[51] Int. Cl. ........................................... H03k 17/00
[50] Field of Search.......................................... 307/252,
284, 305, 293, 133; 323/(ZS), 18, 22 (SLR)

[56] References Cited
UNITED STATES PATENTS

| 3,335,291 | 8/1967 | Gutzwiller..................... | 307/252 |
| 3,390,275 | 6/1968 | Baker............................ | 307/252X |
| 3,449,595 | 6/1969 | Marek........................... | 307/252 |
| 3,504,197 | 3/1970 | Shibuya........................ | 307/252 |

*Primary Examiner*—John S. Heyman
*Assistant Examiner*—John Zazworsky
*Attorneys*—C. Cornell Remsen, Jr., Walter J. Baum, Paul W. Hemminger, Percy P. Lantzy and A. Donald Stolzy ABSTRACT: There is disclosed a circuit including a gate-controlled switch for gating alternating current to a load. A timing circuit is employed to turn the switch on or off at a predetermined time after the line voltage reaches zero. The device of the invention is especially useful as a test circuit for applying a voltage or interrupting a current to a load at a predetermined time during the cycle of the line voltage. A zero point detector having a manually operable switch is employed to actuate the timing circuit.

PATENTED MAY 4 1971 3,577,011
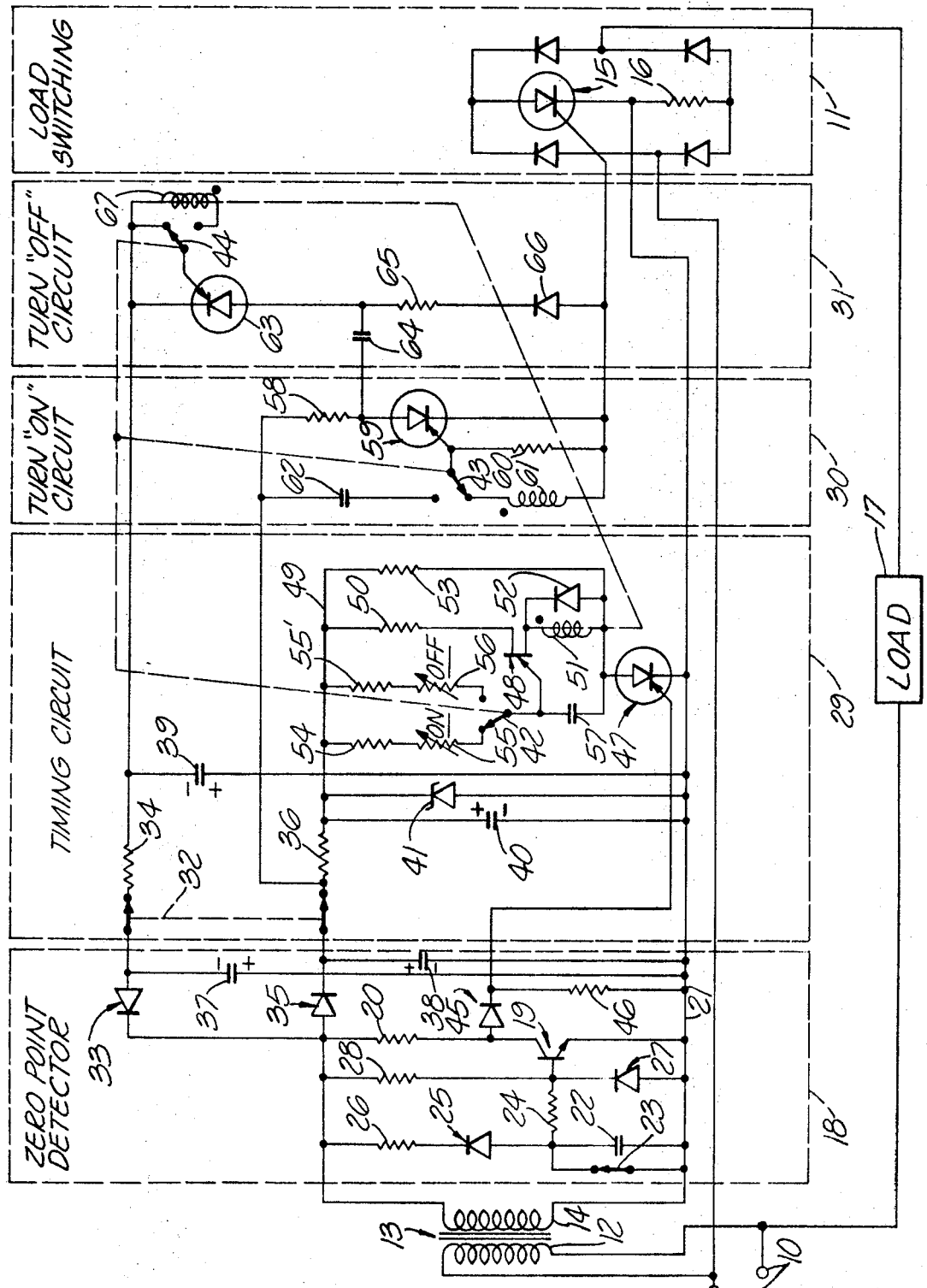
INVENTORS.
J. RAFFAELLI
H. LOKKART
BY
ATTORNEY

TEST CIRCUIT

BACKGROUND OF THE INVENTION

This invention relates to power control systems, and more particularly to a circuit for controlling alternating current to a load.

It is often desirable to control the alternating current to a device under test by initially applying the peak value or other value of voltage of an alternating wave. Transients may thus be observed to evaluate the device under test. However, to the present time, no such control circuit has been available.

SUMMARY OF THE INVENTION

In accordance with the circuit of the present invention, the above-described and other disadvantages of the prior art are overcome by providing a gate-controlled switch and an alternating-current rectifier load-switching circuit with a timing circuit for producing an output pulse at a predetermined time after its actuation.

The gate-controlled switch is made responsive to the output pulse for controlling load current. A zero point detector is also provided for actuating the timing circuit when the supply voltage goes to zero and the supply voltage is of a predetermined polarity.

In accordance with the invention, it is possible to employ a manually operable switch in the zero point detector to ready the timing circuit so that the first voltage applied to the load is the maximum or other selected value of the supply voltage.

In this way, transients may be observed in a device under test with various initial amplitudes of voltage of an alternating waveform applied.

The above-described and other advantages of the present invention will be better understood from the following description when considered in connection with the accompanying drawings.

BRIEF DESCRIPTION OF THE DRAWINGS

In the drawings, which are to be regarded as merely illustrative:

The FIGURE is a schematic diagram of the circuit of the present invention.

DESCRIPTION OF THE PREFERRED EMBODIMENT

In the drawings, the AC power source is connected to terminals 10. From terminals 10 the AC power is applied to a primary winding 12 of a transformer 13, having a 24-volt secondary winding 14. The AC power from terminals 10 is also applied through a load-switching circuit 11 to the load 17.

Load-switching circuit 11 is a full-wave rectifier circuit operated by a gate-controlled switch 15 having an optional current monitoring resistor 16 connected in series therewith. The load 17 is connected across the bridge. A zero point detector 18 is connected from the one secondary winding 14. A transistor 19 has its collector connected to one end of winding 14 through a resistor 20 and an emitter connected to a common line 21. Transistor 19 is operated at cutoff or at saturation depending upon the charge on a capacitor 22 and depending upon whether or not a normally closed initiating switch 23 is open or not. Capacitor 22 is connected to the base of transistor 19 through a resistor 24. Capacitor 22 is connected from common line 21 to the upper end of winding 14 through a diode 25 and a resistor 26. The base of transistor 19 is connected to common line 21 by a diode 27 and to other end of winding 14 by a resistor 28.

The diagram shown in the drawings also includes a timing circuit 29, a turn "on" circuit 30, and a turn "off" circuit 31.

Twenty-four-volt power is supplied to the said circuit through a double-pole single-throw reset switch 32. A diode 33 and a resistor 34 are connected in series with the turn "off" circuit 31. A diode 35 and a resistor 36 are connected in series with timing circuit 29. The junction of switch 32 and resistor 36 is connected to turn "on" circuit 30. A capacitor 37 is connected from the anode of diode 33 to common line 21. A capacitor 38 is connected from the cathode of diode 35 to common line 21. A capacitor 39 is connected from resistor 34 to common line 21. A capacitor 40 and a Zener diode 41 are connected from resistor 36 to common line 21.

In accordance with the present invention, the circuit shown in the drawings may be operated in either one of two modes. One mode is to turn on alternating-current power to load 17 after capacitor 22 has charged during the negative half-cycle and the powerline waveform reverses and goes positive. Alternatively, the circuit may be employed to turn off alternating-current power to load 17 on the same conditions. These modes are determined by the positions of mode switches 42, 43, and 44, which are ganged. Transistor 19 through a diode 45, controls the gate of a silicon-controlled rectifier (SCR 47). This prevents timing circuit 29 from firing until the proper conditions arrive. The gate of SCR 47 is shunted to common line 21 by means of resistor 46.

Timing circuit 29 includes a unijunction transistor 48 connected from a common line 49, through a resistor 50, through the primary winding 51 of a pulse transformer to the anode of SCR 47. A diode 52 is connected across winding 51. Resistor 53 is connected from common line 49 to the anode of SCR 47. A resistor 54 and a potentiometer 55 are connected from common line 49 to switch 42. Similarly, a resistor 55' and a potentiometer 56 are connected from common line 49 to switch 42. The position of potentiometer 55 determines the "turn on" time, and the position of potentiometer 56 determines the "turn off" time. A capacitor 57 is connected from switch 42 to the anode of SCR 47.

The turn "on" circuit 30 has a resistor 58 connected from switch 32 to an SCR 59 that is connected to the gate of gate-controlled switch 15. Gate-controlled switch 15 is the semiconductor type which will turn on when a positive gating voltage is applied and will turn off when a negative gate voltage is applied. A resistor 60 is connected from the gate of SCR 59 to the gate of gate-controlled switch 15. One secondary of the pulse transformer, indicated at 61, is connected from switch 32 to switch 43.

Turn "off" circuit 31 comprises an SCR 63 connected from resistor 34 to a capacitor 64 that is, in turn, connected to the anode of SCR 59. A resistor 65 and a diode 66 are connected from the anode of SCR 63 to the gate of gate-controlled switch 15. A secondary winding 67 of the pulse transformer is then connected across switch 44, and switch 44 is connected to the gate of SCR 63.

In the operation of the circuit of the present invention, the zero point detector 18 determines when 0 volts (positive going) occurs on the powerline waveform. When this happens and switch 23 is open, SCR 47 is fired and the timing circuit started.

When the initiating switch 23 is not operated (closed position), no firing pulse to SCr 47 is available because during the positive half-cycle (with respect to the 24 v. AC common line) transistor 19 is biased "on" by positive base current, and as a result, shorts out any gate current that would otherwise flow to SCR 47. Further, during the negative half-cycle, diode 45 will be reversed biased, blocking all current flow.

When the initiating switch 23 is operated (opened) any time during the positive half-cycle, transistor 19 will still be shorting out the positive gate drive to SCR 47. When the initiating switch 23 is opened during the negative half-cycle however, capacitor 22 will be charged through diode 25. As soon as, thereafter, the powerline waveform reverses and goes positive, the charge on capacitor 22 will cause a negative base current in transistor 19, which will keep it cut off and, as a result, with the sine wave increasing in amplitude, SCR 47 will now be fired as soon as enough gate current flows which is only a few degrees away from 0 volts on the powerline waveform. This point of triggering will be considered 0 volts for all practical purposes. If very close timing is required, this "delay" of a few degrees can be corrected for in the setting of the timing selector since this delay is constant (with constant temperature).

If the initiating switch 23 is closed too late in the negative half-cycle to charge capacitor 22, SCR 47 would not be triggered on the next positive-going half of the sine wave, but on the succeeding one since another negative half wave would have to occur first to provide enough cutoff base current stored in capacitor 22 for transistor 19. The initiating switch 23 does not have to be maintained in the open position. After SCR 47 has fired, it needs no further gate drive to remain in the conducting state. In other words, the initiating switch 23 needs only to be depressed momentarily.

With SCR 47 fired, the timing circuit is provided with 24 v. DC regulated by 24 v. Zener diode 41.

When power is applied (through the firing of SCR 47), timing capacitor 57 begins to charge through either one of the two timing resistors 54 or 55' depending on the position of the mode selector switches 42, 43, and 44. When the threshold voltage of the unijunction transistor 48 has been reached, this transistor fires and capacitor 57 discharges through the primary 51 of the pulse transformer making an output pulse available at both secondary windings 61 and 67.

The timing capacitor 57 is of a fixed value. The timing resistance, however, is adjustable through potentiometers 55 and 56. This makes it possible to adjust the time in which the capacitor 57 reaches the threshold voltage. The range of each potentiometer 55 and 56 is so chosen that the load current can be turned "on" or "off" with a delay adjustable practically from 0° to 360° after the powerline waveform goes positive through 0 volts.

With the mode switches 42, 43, and 44 in the programmed turn "on" position, SCR 59 will be fired by a pulse from secondary 61 of the pulse transformer. This will cause a DC current to flow from the supply through the gate of the gate-controlled switch 15. Power will now be applied to load 17 by the switching action of the gate-controlled switch 15.

The DC current through the gate of the gate-controlled switch 15, as well as the AC current through the load 17, will continue to flow until the reset switch 32 is momentarily opened. This will return SCR 47 and SCR 59 to their blocking states immediately. The anode current through the gate-controlled switch 15, and, therefore the AC current through the load 17, will continue to flow until the powerline waveform goes through zero.

During operation in the programmed turn "on" mode, the gate of SCR 63 is shorted to the cathode, rendering this unit inoperative for switching. With the mode switches 42, 43, and 44 in the programmed turn "off" position, the gate of SCR 59 is connected to the + supply through capacitor 62. A closure of the reset switch 32, after it has momentarily been opened, will send the charge current of capacitor 62 through the gate of SCR 59 and will turn "on" SCR 59 which, in turn, will turn "on" the gate-controlled switch 15 after which power is applied to load 17. Since SCR 59 is conducting DC current, it needs no further gate drive to remain in the conductive state.

This mode of turn "on" is uncontrolled and occurs at random with respect to the powerline waveform. With power being supplied to the load, the circuit is ready for controlled turn "off" operation. When the initiating switch 23 is opened, zero voltage on the powerline waveform will be detected. Then the timing circuit 29 will, after the preset time has elapsed, produce a trigger pulse out of pulse transformer secondary 67. This will trigger SCR 63 which will apply a negative potential to capacitor 64 through which the anode voltage of SCR 59 will be pulled down momentarily. This will return SCR 59 to the blocking state, cutting off gate supply to the gate-controlled switch 15, and consequently AC current flow through the load 17 will be stopped.

Both programmed turn "on" and programmed turn "off" have been discussed as two individual modes of operation. It is possible, however, that a programmed turn "off" operation is to be followed by a programmed turn "on" operation. In this case the following procedure is followed: The programmed turn "off" is performed as described above. Then, while the reset switch 32 is held depressed, the position of the mode switches 42, 43, and 44 are changed. Now the circuit is ready for programmed turn "on," as described above. The reason for holding the reset switch while changing mode is to remove DC power from the circuit so switching transients from the mode switches will not fire any of the SCRs.

From the foregoing, it will be appreciated that depending upon the position of switches 42, 43, and 44, turn "on" circuit 30 or turn "off" circuit 31 may be employed to turn on or turn off alternating-current power to load 17. This means that it is possible to test circuit elements and the like for their behavior under transient conditions resulting from power being applied or removed at the peak value or other values of the applied alternating voltage.

Many changes and modifications of the invention may be made without departing from the invention. The embodiment selected for this disclosure is illustrative only. Thus, the true scope of the invention is defined only in the appended claims.

We claim:

1. A control circuit for supplying a load with predetermined starting and terminating voltages, said circuit comprising: first means to supply an alternating voltage; second means connected from said first means and actuable by said alternating voltage to produce a gating signal at a predetermined time after said alternating voltage becomes substantially equal to zero; an ON circuit; an OFF circuit; said second means having output means to impress said gating signal on both of said ON and OFF circuits at the same time; selectively actuable switch means connected to said ON and OFF circuits to prevent said gating signal from being impressed on one of said ON and OFF circuits while passing said gating signal to the other of said ON and OFF circuits, said switch means also being actuable to prevent said gating signal from being impressed on said other circuit while passing said gating signal to said one circuit; and a load-switching circuit connected from said first means for connection to the load, said load-switching circuit having an electrical operable switch actuable to connect said first means across the load and actuable to disconnect said first means from the load, said ON and OFF circuits producing ON and OFF output signals, respectively, said load-switching circuit being connected from both of said ON and OFF circuits, said switch being connected to receive and adapted to be actuated by said ON and OFF signals, said ON signal causing said switch to connect said first means to the load, said OFF signal causing said switch to disconnect said first means from the load, said ON circuit being adapted to produce said ON signal when said gating signal is produced and passed by said switch means to said ON circuit, said OFF circuit being adapted to produce said OFF signal when said gating signal is produced and passed by said switch means.

2. The invention as defined in claim 1, wherein said second means includes a capacitor, a first single-pole, double-throw switch having two contacts and two potentiometers connected from said two contacts, respectively, said switch means including second and third single-pole, double-throw switches for said ON and OFF circuits, respectively, all of said first, second and third switches being ganged together, third means to supply two DC voltages to said ON and OFF circuits, respectively, said DC voltages being of opposite polarities, and a double-pole, double-throw switch connected between said third means and said ON and OFF circuits, said second means including a start switch which disables said second means until said start switch is actuated.